(12) United States Patent
White et al.

(10) Patent No.: US 9,911,351 B2
(45) Date of Patent: Mar. 6, 2018

(54) TRACKING OBJECTS DURING PROCESSES (71) Applicant: MICROSOFT TECHNOLOGY LICENSING, LLC, Redmond, WA (US)

(72) Inventors: Christopher White, Seattle, WA (US); Anson Tsao, Redmond, WA (US); David Molyneaux, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/192,337

(22) Filed: Feb. 27, 2014

(65) Prior Publication Data

US 2015/0243013 A1 Aug. 27, 2015

(51) Int. Cl.
*G06F 3/01* (2006.01)
*G09B 5/06* (2006.01)
(Continued)

(52) U.S. Cl.
CPC .............. *G09B 5/06* (2013.01); *G06F 3/011* (2013.01); *G06F 3/017* (2013.01); *G06F 3/0304* (2013.01);
(Continued)

(58) Field of Classification Search
CPC ..... G06F 3/017; G06T 19/006; G06T 7/0042; G06T 7/004; G06T 7/20;
(Continued)

(56) References Cited

U.S. PATENT DOCUMENTS 7,814,122 B2 10/2010 Friedrich et al.
2002/0187846 A1* 12/2002 Funk .................. A63B 24/0003
473/219
(Continued)

FOREIGN PATENT DOCUMENTS

WO 0005639 A2 2/2000

OTHER PUBLICATIONS

Gammeter, Stephan, Alexander Gassmann, Lukas Bossard, Till Quack, and Luc Van Gool. "Server-side object recognition and client-side object tracking for mobile augmented reality." In 2010 IEEE Computer Society Conference on Computer Vision and Pattern Recognition-Workshops, pp. 1-8. IEEE, 2010.*
(Continued)

*Primary Examiner* — Sumati Lefkowitz
*Assistant Examiner* — Carol Wang
(74) *Attorney, Agent, or Firm* — Alleman Hall Creasman & Tuttle LLP (57) ABSTRACT

Embodiments are disclosed that relate to tracking one or more objects during a process that utilizes the objects. For example, one embodiment provides a method for monitoring performance of a process involving one or more objects, wherein the method includes receiving a set of rules defining one or more portions of the process and receiving object identification information regarding the one or more objects. The method further includes, for a selected portion of the process, receiving image information of a physical scene, identifying from the image information and the object identification information an operation performed with an identified object in the physical scene, and taking an action based upon whether the operation satisfies a rule of the set of rules associated with the selected portion of the process.

19 Claims, 6 Drawing Sheets

(51) Int. Cl.
*G06F 3/03* (2006.01)
*G06T 7/70* (2017.01)
*G06Q 10/00* (2012.01)

(52) U.S. Cl.
CPC .............. *G06T 7/70* (2017.01); *G06Q 10/20* (2013.01); *G06T 2207/10004* (2013.01); *G06T 2207/30108* (2013.01)

(58) Field of Classification Search
CPC . G06T 2207/10016; G06T 2207/30164; G06T 2207/10028; G06T 2207/20081; G06T 17/00; G06T 2219/2008; G05B 2219/32014; G05B 2219/1027; G05B 2219/35482; G05B 2219/35495; G05B 2219/31046; G05B 19/4183
See application file for complete search history.

(56) References Cited

U.S. PATENT DOCUMENTS

| | | | |
|---|---|---|---|
| 2004/0046736 A1 | 3/2004 | Pryor et al. | |
| 2005/0181884 A1* | 8/2005 | Beach | A63B 53/0466 473/131 |
| 2005/0272517 A1* | 12/2005 | Funk | A63B 15/00 473/222 |
| 2006/0063574 A1* | 3/2006 | Richardson | A63B 24/0021 463/1 |
| 2008/0182685 A1* | 7/2008 | Marty | A63B 24/0003 473/407 |
| 2008/0312010 A1* | 12/2008 | Marty | A63B 24/0003 473/447 |
| 2009/0258703 A1* | 10/2009 | Brunstetter | A63F 13/12 463/36 |
| 2010/0208038 A1* | 8/2010 | Kutliroff et al. | 348/46 |
| 2010/0281432 A1* | 11/2010 | Geisner et al. | 715/849 |
| 2010/0306712 A1* | 12/2010 | Snook et al. | 715/863 |
| 2011/0085705 A1* | 4/2011 | Izadi et al. | 382/103 |
| 2011/0173204 A1* | 7/2011 | Murillo et al. | 707/741 |
| 2011/0298827 A1* | 12/2011 | Perez | 345/647 |
| 2011/0299729 A1* | 12/2011 | Dawe | A63B 24/0003 382/103 |
| 2012/0064498 A1 | 3/2012 | Swain | |
| 2012/0113223 A1* | 5/2012 | Hilliges et al. | 348/46 |
| 2013/0010207 A1 | 1/2013 | Valik et al. | |
| 2013/0042296 A1* | 2/2013 | Hastings et al. | 726/1 |
| 2013/0225305 A1* | 8/2013 | Yang | A63F 13/00 473/152 |
| 2014/0003666 A1* | 1/2014 | Park | G09B 19/0038 382/103 |
| 2014/0047457 A1* | 2/2014 | Nojima | G09B 19/0038 719/313 |
| 2014/0092292 A1* | 4/2014 | Kuznetsov | H04N 5/23222 348/333.02 |

OTHER PUBLICATIONS

Bau, Olivier et al., "REVEL: Tactile Feedback Technology for Augmented Reality", ACM Transactions on Graphics, vol. 31, No. 4, Article 89, http://delivery.acm.org/10.1145/2190000/2185585/a89-bau.pdf, Jul. 2012, 11 pages.

Lerman, Alona et al., "Using Augmented Reality as a Feedback System for Gesture Based Interfaces", http://www.omekinteractive.com/blog/augmented-reality-as-feedback, Feb. 27, 2013, 8 pages.

Yamashita, Atsushi et al., "Assisting System of Visually Impaired in Touch Panel Operation Using Stereo Camera", 18th IEEE International Conference on Image Processing, http://sensor.eng.shizuoka.ac.jp/~yamasita/paper/B/B067Final.pdf, Sep. 11, 2011, 4 pages.

Feiner, S., et al., "Knowledge-Based Augmented Reality", In Proceedings of Communications of the ACM, vol. 36, Issue 7, Jul. 1993, 10 Pages.

Raghavan, V., et al., "Interactive Evaluation of Assembly Sequences Using Augmented Reality", In Proceedings of IEEE Transactions on Robotics and Automation, vol. 15, Issue 3, Jun. 1999, 15 pages.

Henderson, S., et al., "Augmented Reality in the Psychomotor Phase of a Procedural Task", In Proceedings of 10th IEEE International Symposium on Mixed and Augmented Reality, Oct. 2011, 10 Pages.

"Augmented Reality in the Psychomotor Phase of a Procedural Task", ColumbiaCGUI, <https://www.youtube.com/watch?v=2eSIMSJ65Kc>, Published on Mar. 25, 2012, 1 page.

ISA International Search Report and Written Opinion issued in Patent Application No. PCT/US2015/017405, May 21, 2015, Netherlands, 12 Pages.

IPEA European Patent Office, International Preliminary Report on Patentability issued in PCT Application No. PCT/US2015/017405, May 10, 2016, WIPO 9 pages.

Bolle, R. et al, "A Complete and Scalable Architecture for 3D Model-Based Vision," 5th IEEE International Symposium on Intelligent Control, Sep. 5, 1990, Philadelphia, PA, 8 pages.

Natonek, E. et al., "Recognition of 3-D Objects on Complex Backgrounds Using Model Based Vision and Range Images," IEEE Southwest Symposium on Image Analysis and Interpretation, Apr. 21, 1994, Dallas, TX, 6 pages.

IPEA European Patent Office, Second Written Opinion Issued in Application No. PCT/US2015/017405, Jan. 29, 2016, WIPO, 8 Pages.

* cited by examiner

TRACKING OBJECTS DURING PROCESSES

BACKGROUND

Many processes involve manipulations of objects. For example, assembly or disassembly of a system such as a piece of furniture or an engine may comprise many individual steps that each involve movement, placement, and/or modification of a potentially large number of objects. As such, many opportunities may exist for making errors during a process that involves manipulating objects.

SUMMARY

Embodiments are disclosed that relate to tracking one or more objects during a process that utilizes the objects. For example, one disclosed embodiment provides a method for monitoring performance of a process involving one or more objects, wherein the method includes receiving a set of rules defining one or more portions of the process and receiving object identification information regarding the one or more objects. The method further includes, for a selected portion of the process, receiving image information of a physical scene, identifying from the image information and the object identification information an operation performed with an identified object in the physical scene, and taking an action based upon whether the operation satisfies a rule of the set of rules associated with the selected portion of the process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Various forms of instructions may be provided to help a person learn or otherwise follow a complex process that involves manipulating objects. For example, instructions may take the form of static diagrams and/or text, or a video demonstrating the process. However, such instructions may in some cases be difficult to understand and follow, or otherwise be confusing to the user. Further, it may be difficult for a user to determine if they are performing the process correctly.

Accordingly, embodiments are disclosed herein that relate to automatically observing a user perform a process to determine whether the user is performing the process correctly. Additionally, feedback may be provided to the user to help the user perform the process correctly. Briefly, an image sensor such as a depth camera may collect image data capturing the user performing the process. Based on the collected image data, the user and objects in the scene may be identified and tracked. Movements of the objects that are detected from the image data may be compared to a set of rules that define each step of the process. Based upon these comparisons, the user may be informed if he or she is performing the process correctly, and if not, may be instructed how to properly perform the process. The disclosed embodiments also may be used for quality control, for auditing worker productivity, and for other tasks where observation of how processes are performed may be valuable.

Figure 1:
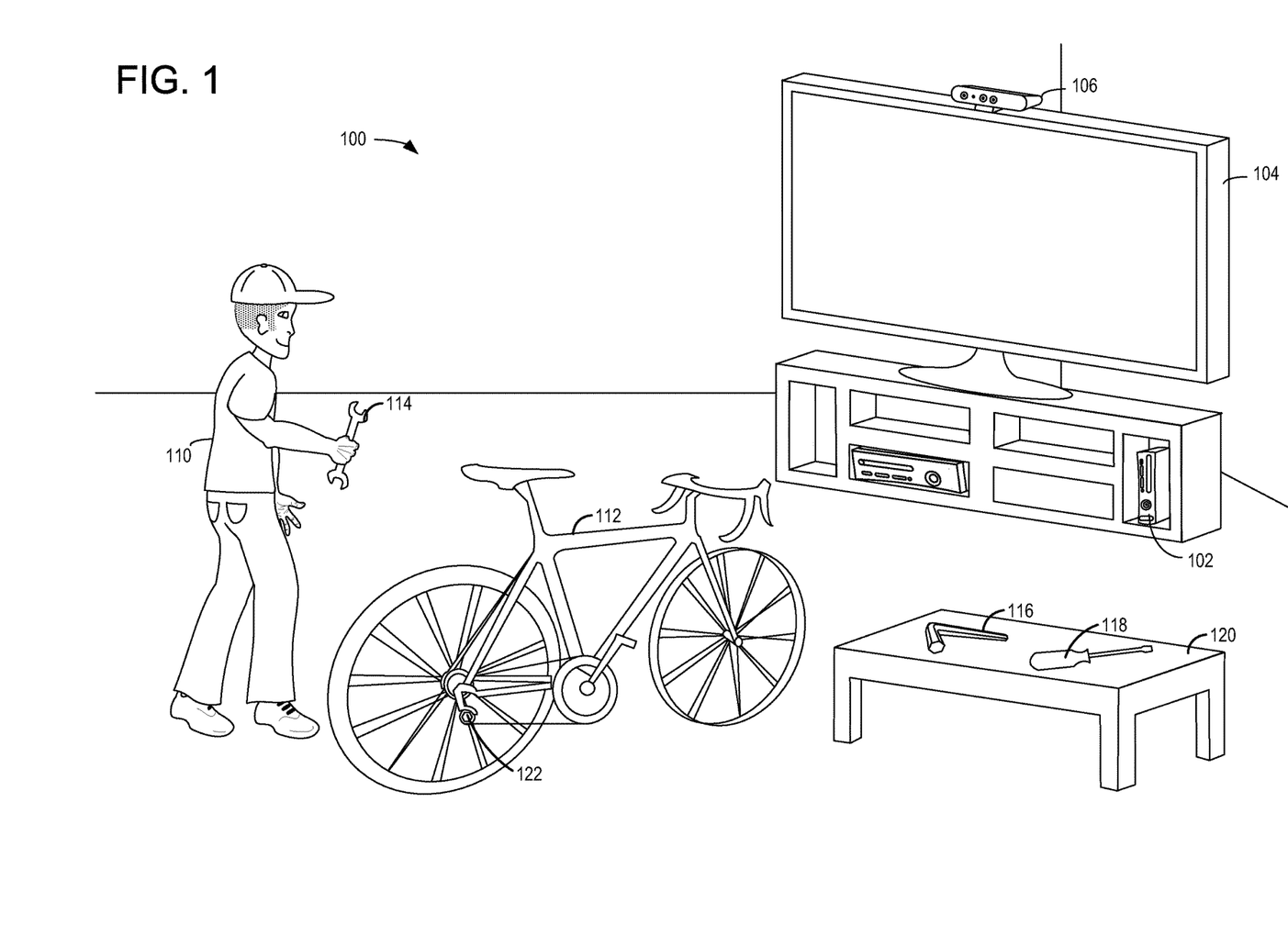
FIGS. 1-3 show a schematic depiction of a user performing a process in an example environment according to an embodiment of the present disclosure.

FIG. 1 shows a non-limiting example use environment 100 comprising a computing device 102 communicatively connected to a display device 104 and a sensor system 106. Although environment 100 is illustrated as a room, a use environment may be any suitable physical space, including indoor and/or outdoor environments. Computing device 102 may be used to play a variety of different games, play one or more different media types, and/or control or manipulate non-game applications and/or operating systems. Computing device 102 may receive input from one or more control devices, which may include any suitable control device, such as game controllers, remote controls, mobile computing devices, etc.

Sensor system 106 may include a visible light camera (e.g., an RGB camera), a stereo or array camera system, and/or a depth camera (e.g., time-of-flight and/or structured light depth camera). For example, sensor system 106 may include one or more sensors, lens elements, and/or light sources that are configured to image environment 100. Depth images captured by a depth camera may indicate a depth of a surface imaged by each pixel in order to provide information regarding one or more features of environment 100. Sensor system 106 may comprise additional sensors, including but not limited to one or more microphones (e.g., a directional microphone array). Sensor system 106 may generate and send images to computing device 102 via one or more interfaces via any suitable wired or wireless data connection. Although a single sensor system 106 is illustrated in FIG. 1, it is to be understood that one or additional cameras may be included in the environment, and one or more cameras may be moveable within the environment (e.g. a camera integrated into a mobile device, such as a smart phone, tablet, or laptop).

The computing device may utilize information from sensor system 106 to observe user 110 performing a process on one or more objects in the real-world environment by tracking movements of the user and the one or more objects in the environments as the objects are manipulated during performance of the process, and comparing the movements to rules that define the process steps. In embodiments that provide feedback, if an operation in the process does not satisfy a condition of the rule for that operation, the user may be instructed how to satisfy the rule, for example, by outputting instructional information via a display device, a speaker, and/or in other suitable form.

Computing device 102 may obtain object identification information to help identify one or more objects used in a process. The object identification information obtained may be used with the image information received from the sensor system 106 in real time (i.e. as the user performs a process with the objects) to identify the one or more objects in the physical scene. The object identification information may include any suitable information that allows objects to be identified. For example, the object identification information may include, for each object, three-dimensional object data (e.g. for performing pattern matching) and/or an identification function (e.g. for performing classification).

The object identification information may be obtained by computing device 102 in any suitable manner. As one non-limiting example, the object identification information may be obtained from a remote service at which a user can obtain instructional information for a specific process (e.g. an instructional website for a product to be assembled via the process), and may be obtained along with a set of rules for the process to be performed. Likewise, identification information for objects not specifically used in the process also may be obtained. For example, identification information for common tools may be obtained for a process that utilizes tools to help distinguish incorrect tools from correct tools.

The object identification information may be used to segment the imaged physical scene into one or more segmented objects, and also to classify the segmented objects in order to determine the identity of each object regardless of an orientation of the object. For example, object identification information for a wrench may allow wrench 114 to be identified from any angle or position, and potentially when it is being held by a hand of user 110 and thus partially occluded. Further, as the object is manipulated, motion of the object may be tracked in six degrees of freedom, and the position of the object throughout the step may be tracked and compared to the rules for that step.

In example of FIG. 1, user 110 may be repairing a rear derailleur system on bicycle 112. Thus, the set of rules used to track performance of the process may define a plurality of steps for repairing the rear derailleur system. Each step of the process may be defined by such parameters as a starting location, an ending location, and potentially a path between the starting location and the ending location. As the user performs the repair process, computing device 102 uses the object identification information to identify the objects used in the operation (e.g. derailleur pulley, derailleur pulley bolt, bicycle rear wheel, and tools used in the process).

As used herein, the various locations, positions, and paths of identified objects may be defined according to a suitable coordinate system. In one example, the coordinate system may be based on the camera. In another example, the coordinate system may be an absolute world coordinate system, where the system maintains a mapping between the camera's view and the world coordinate system. A still further example is a coordinate system relative to other components in the system (e.g., the path and locations for the objects of the bike derailleur process may be defined relative to the position of the bike).

One possible step in such a repair process may be to tighten a derailleur pulley bolt 122. Such a step may include rules that define a tool to be used for the step, a starting position of the derailleur pulley bolt (e.g. not fully screwed into the derailleur pulley, as defined by a greater offset between the bolt head and the pulley), and a finishing position (e.g. fully screwed into the derailleur pulley, as defined by a lesser offset). When the user performs the process, each of these conditions is to be satisfied before the step is determined to be performed correctly. Further, where any step is not performed correctly, feedback may be provided to the user.

Figure 2:
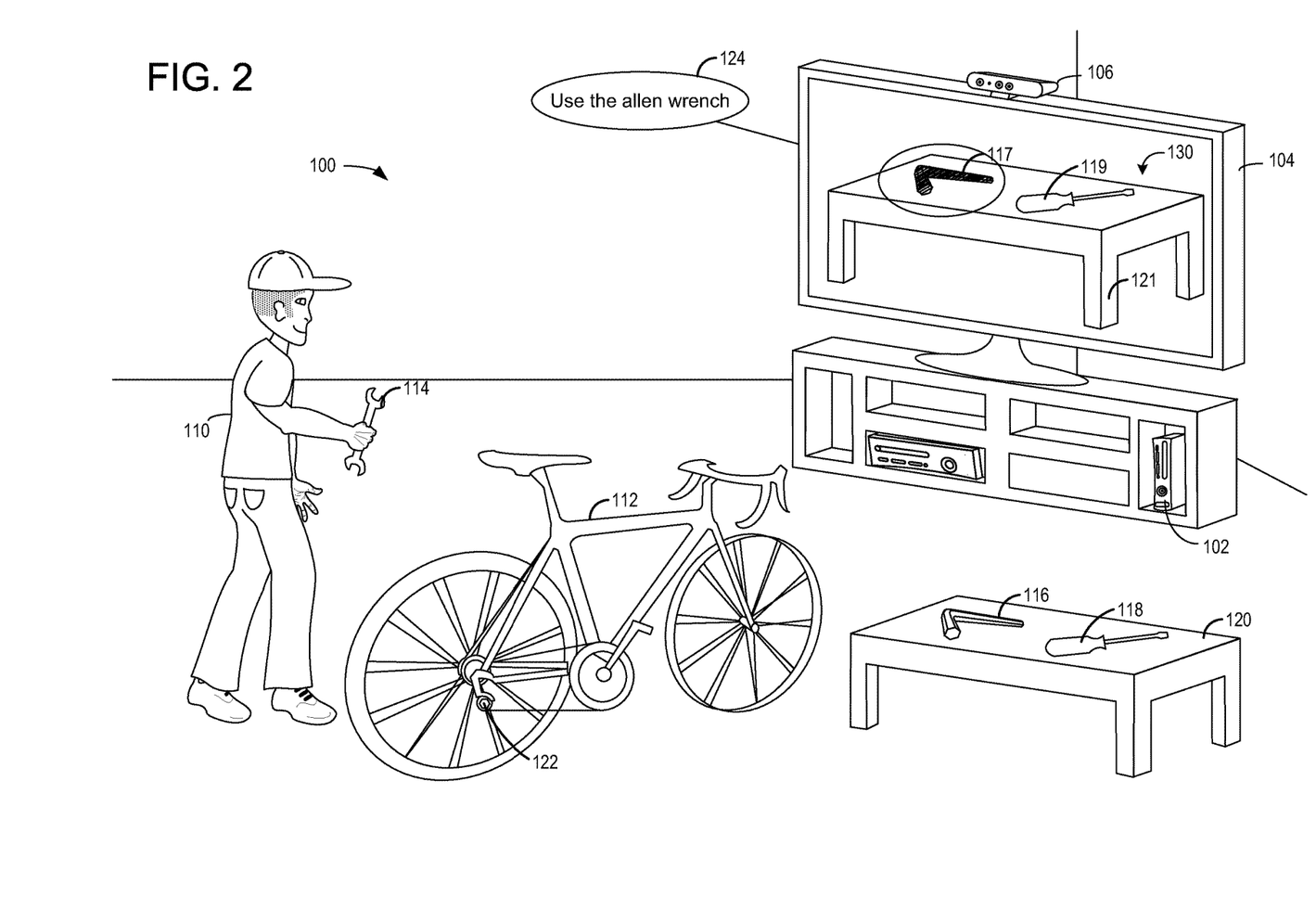

In the example of FIG. 1, a step in the process may comprise selecting an Allen wrench 116, which is resting on table 120. Thus, a rule for this step in the process may require selection of Allen wrench 116 before the rule is satisfied. As shown in FIG. 1, user 110 has selected wrench 114 instead of Allen wrench 116. Computing device 102 may identify that user 110 has selected wrench 114, and that wrench 114 does not satisfy the rule. In this instance, computing device 102 may alert the user that the wrong tool was selected, and may instruct the user how to satisfy the rule. FIG. 2 illustrates an example of an instructional output provided by computing device 102 in the form of an augmented reality view 130 of a portion of the room that shows an image or representation of the table 121, an image or representation of the Allen wrench 117 and a screwdriver 119 on the table, and highlighting to demonstrate to user 110 to select Allen wrench 116. Alternatively or additionally, computing device 102 may output an auditory instruction 124 indicating that the user 110 should select Allen wrench 116. It is understood that these specific instructional outputs are described for the purpose of example, and are not intended to be limiting in any manner.

Figure 3:
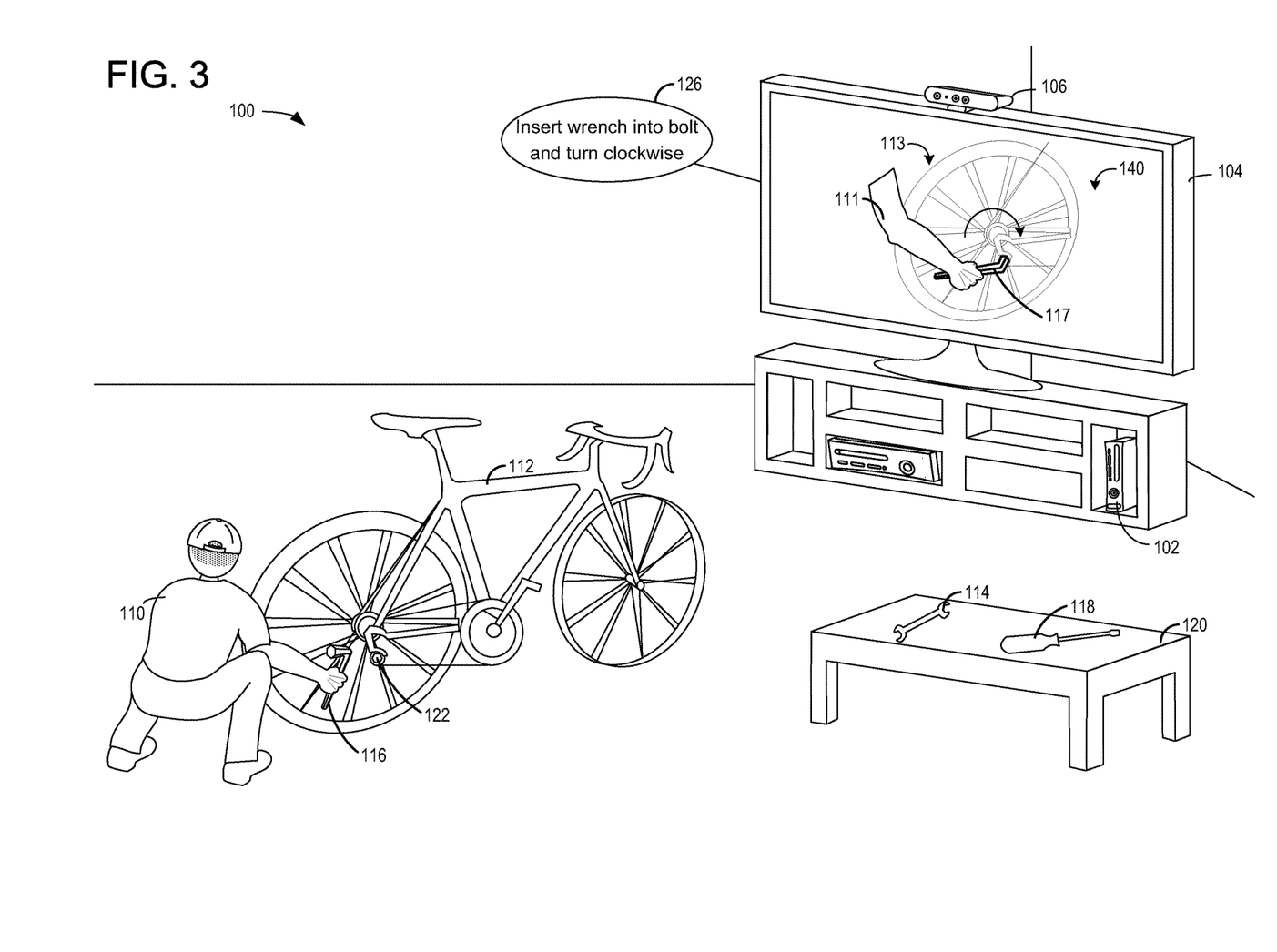

As stated previously, once computing device 102 has determined that the operation performed by the user has satisfied the rule, the process may advance to a subsequent portion of the process. For example, FIG. 3 illustrates that user 110 has picked up Allen wrench 116, and thus satisfied this rule. A next step in the process may comprise moving the pulley bolt 122 to a specified end position. As an instructional aide, computing device 102 outputs another augmented reality image 140 via display device 104. Augmented reality view 140 shows a representation of a portion of the bicycle 113 surrounding pulley bolt 122. The representation of the Allen wrench 117 is displayed over the representation of the bicycle 113. Further, an instructional hand 111 is holding the representation of the Allen wrench 117 in a specified position so that the representation of the Allen wrench 117 is engaging the representation of the pulley bolt. An arrow is displayed as instruction to turn the Allen wrench 116 clockwise. Additionally, an auditory instruction 126 is also instructing the user 110 to turn the Allen wrench 116 clockwise.

As described above, a user may be instructed how to perform a step of the process if the user fails to perform the step correctly. Further, in some embodiments, the user also may be instructed how to satisfy the rule before attempting to perform the step. In such circumstances, the instruction may be output upon determining that the previous rule has been satisfied.

A step of a process may be defined in any suitable manner. For example, a step may be defined as movement of an object in at least one of six degrees of freedom. In this way, movement of the object may include twisting, turning, pulling, or other types of movement. Further, the movement of the object during the operation may not be fully defined. For example, in some rules, a beginning position or an end position may not be defined. As a more specific example, a step may include removal of a specific object (e.g., a pedal) from the bicycle, where the end position is undefined. In this regard, the operation may satisfy the rule once the pedal is removed from the bicycle, regardless of where the pedal is placed after removal. Likewise a path for an object during a process may or may not be defined in various rules.

Figure 4:
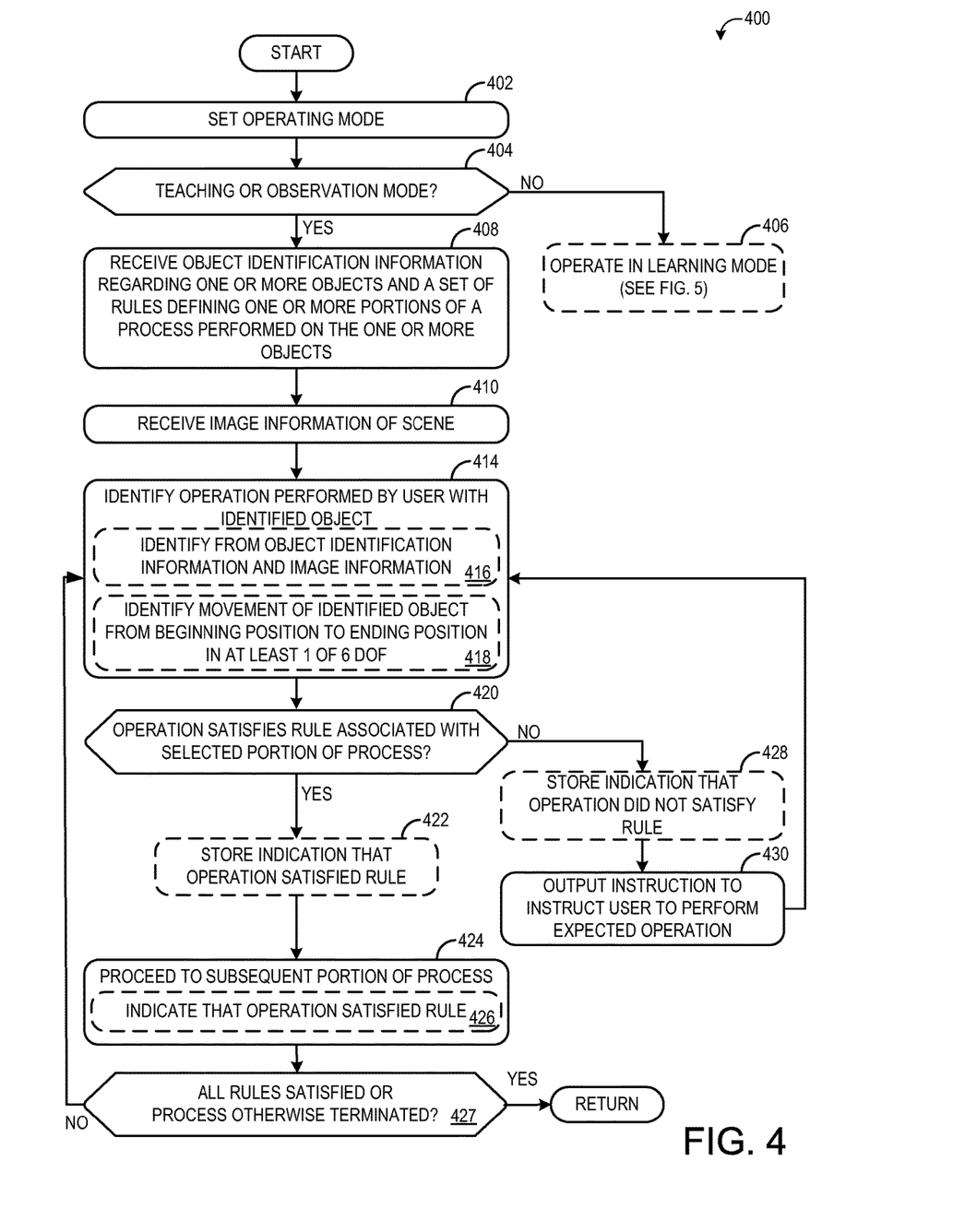
FIG. 4 shows a flow diagram illustrating an embodiment of a method for tracking one or more objects during performance of a process.
Figure 5:
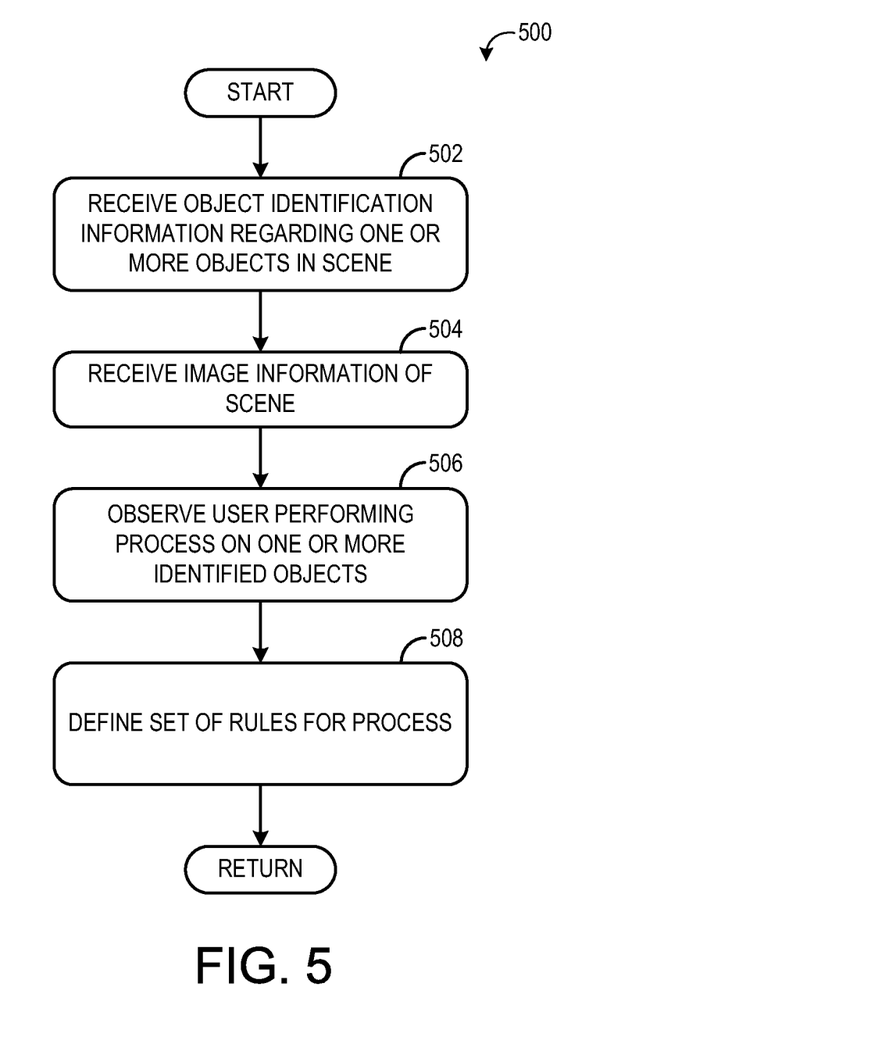
FIG. 5 shows an embodiment of a method for training a computing system to recognize a process performed with one or more objects.

FIGS. 4 and 5 illustrate embodiments of methods for tracking objects during a process. FIG. 4 shows an embodiment of a method 400 for instructing a user in an observation and/or teaching mode and FIG. 5 shows an embodiment of a method 500 for instructing the user in a learning mode. In an observation mode, a user may be observed performing a process, but instructions may not be provided regarding steps. An observation mode may be used for quality control, auditing, and other such purposes. Similarly, an instructional mode may be used to observe a user performing a process and provide feedback to teach a user to perform the process. In contrast, a learning mode may be used to train a computing device to recognize a process and to define rules for the process. Methods 400 and 500 each may be carried out by one or more computing devices, such as computing device 102, according to stored instructions and using image information of a physical scene received from an image sensor, such as image sensor incorporated in sensor system 106.

In embodiments that support operating in multiple modes, method 400 may include, at 402, setting an operating mode. Setting the operating mode may include, for example, receiving a user input regarding an operating mode. Setting the operating mode also may include observing the movements of the user and any identified objects in the physical scene and determining if the user is performing a known or unknown process. If the user is performing a known process (e.g., a process that the user has performed before and/or that the computing device recognizes), the computing device may operate in one or more of the teaching and observation mode. If the user is performing an unknown process, the computing device may request whether the user wishes to operate in the learning mode, and operate in the learning mode upon confirmation. Where multiple operating modes are not supported, such steps may be omitted.

If the computing device is operating in the teaching or observation mode, then method 400 proceeds to 406 to operate in the learning mode, which will be explained in more detail with respect to FIG. 5. On the other hand, if the computing device is operating in the learning and/or observation mode, method 400 comprises, at 408, receiving a set of rules defining one or more portions of a process to be performed by the user using one or more objects, and also receiving object identification information for the objects used in the process.

Each rule may specify one or more of an expected object, an expected first position of the expected object, an expected second position of the expected object, an expected path between the first and second positions, and a time constraint regarding movement of the object from the first position to the second position. The movement of the expected object may include movement in at least one of six degrees of freedom. Likewise, the object identification information may include any suitable information for recognizing an object from image data of a scene, including but not limited to identification functions, three-dimensional object models, etc.

The set of rules may be ordered according to the process being performed. For example, a first rule may be associated with a first portion of the process while a second, subsequent rule is associated with a second, subsequent portion of the process. However, depending on the process, some rules may be ordered while other rules may not be ordered. For example, a third rule may specify an action that is to be performed after a first and second rule are satisfied, regardless of whether the action specified by the first rule is performed before or after the action specified by the second rule.

The set of rules and object identification information may be received from a remote service, received from a removable storage device, stored on the storage device of the computing device, or obtained in any other suitable manner. The set of rules and object identification information may be received in response to a user input or in response to a determination by the computing device that the user is performing a process, or upon any other suitable trigger.

At 410, method 400 includes receiving image information of a physical scene. The physical scene may be the real world environment in which the user is performing the process. The image information may be received from an image sensor, such as sensor system 106, and may include one or more of depth image information and color image information (e.g., RGB information). In one example, the physical scene may be scanned such that one or more images are captured from one or more perspectives with one or more cameras. During the scan, camera movement may be tracked in one or more of six degrees of freedom of movement to determine a location and orientation of the view of the camera.

At 414, method 400 includes identifying an operation performed by a user with an identified object. To identify the operation, the object or objects with which the user is interacting (e.g., the objects present in the physical scene) may be identified based on the image information and the object identification information, as indicated at 416. For example, a comparison of the depth and/or color image data with the object identification information may be performed to identify the objects.

Identifying the operation further may comprise identifying an object being moved from a beginning position to an ending position in at least one of six degrees of freedom, as indicated at 418. As explained previously, in a rule, beginning and ending positions may be defined, or one or more of the beginning and ending positions may be open-ended. For example, referring back to the bicycle repair process explained above with respect to FIGS. 1-3, the operation may include the pulley bolt being screwed in. As such, the object's beginning position and ending position may each be defined, as the pulley bolt head moves relative to the pulley. In another example operation, the Allen wrench may be removed from the engagement with the pulley bolt. As such, the beginning position of the Allen wrench may be defined (engaging with the pulley bolt) but the ending position may be open-ended (where the final resting position of the Allen wrench is irrelevant).

At 420, it is determined if the operation satisfies the rule associated with the portion of the process being performed. Determining that the operation satisfies the rule may include determining if one or more of the conditions defined by the rule, including the expected object, the expected first position of the expected object, the expected second position of the expected object, the expected path between the first and second positions, and/or an expected temporal condition (e.g. how quickly or slowly the step was performed, such as if the expected object is moved from the expected first position to the expected second position within a threshold amount of time) are met by the operation.

If the operation does satisfy the rule, then method 400 may comprise, at 422, optionally storing an indication that the operation satisfied the rule. Storing the indication that the operation satisfied the rule may occur when the computing device is operating in the observation mode, for example. Then method 400 includes, at 424, proceeding to a subsequent portion of the process. This may include providing feedback (visual, auditory, and/or other) that the operation satisfied the rule, as indicated at 426. Proceeding to the subsequent portion of the process further may include identifying from the image information and the object identification information a subsequent operation performed by the user with one or more of the identified object and a different identified object in the physical scene and taking an action based upon whether the subsequent operation satisfies a subsequent rule associated with the subsequent selected portion of the process. The identification and tracking of objects and comparison of object movements to rules may be repeated until all rules are satisfied or the process is otherwise terminated.

Returning to 420, if the operation does not satisfy the rule, then method 400 proceeds to 428 to optionally store an indication that the operation did not satisfy the rule (if operating in the observation mode, for example). Further, method 400 may comprise, at 430, outputting an instruction to instruct the user how to satisfy the rule. Such an instruction may include one or more of an audio instruction and a visual instruction. In some embodiments, a visual instruction may be presented as an augmented reality view of the imaged physical scene displayed on a display device. As one non-limiting example, an animation of a virtual hand performing the step may be overlaid on a representation of the physical scene to demonstrate to the user how to perform the expected operation for that step to satisfy the rule. In another example, a virtual object representing an expected object in the physical scene may be overlaid on the representation of the physical scene and moved to demonstrate how to manipulate the object for that step of the process. Method 400 then loops back to 414 to continue to identify the operation performed by the user to determine if the operation satisfies the rule.

FIG. 5 shows a flow diagram depicting an embodiment of a method 500 for observing a user performing a process while operating in a learning mode. Method 500 may be performed to learn an unknown process for future observation and/or instruction. Method 500 includes, at 502, receiving object identification information regarding one or more objects in the imaged scene. For example, a user may scan each object with a camera, such as a depth camera and/or RGB camera incorporated into a sensor system. The user also may provide identities for each of the scanned objects. Where the objects are known objects, such a scanning process may be omitted for those objects, and existing object identification information may be utilized.

At 504, method 500 comprises receiving image information of the scene, and at 506, observing a user performing a process on one or more identified objects in the scene. As explained above, the object identification information and the image information may be used to identify the objects in the scene as well as track movements of the user and identified objects.

As the identified objects are moved by the user while the user performs the process, the movements may be characterized into operations (e.g., assigned a starting position and an ending position). For example, the user may provide indications of starting and ending points for each step of the process while the process is performed, for example by using voice commands, as well as indicate where path and/or temporal constraints are to be applied. Likewise, operations also may be defined algorithmically (e.g. by observing when specific actions with specific objects start and stop). Based on the defined operations, a set of rules may be defined for the process, as indicated at 508, wherein the set of rules specify one or more operations or actions performable by a user on the identified objects. The set of rules may be stored on the computing device and/or sent to a remote service, where they may be subsequently available to instruct a user performing the process.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
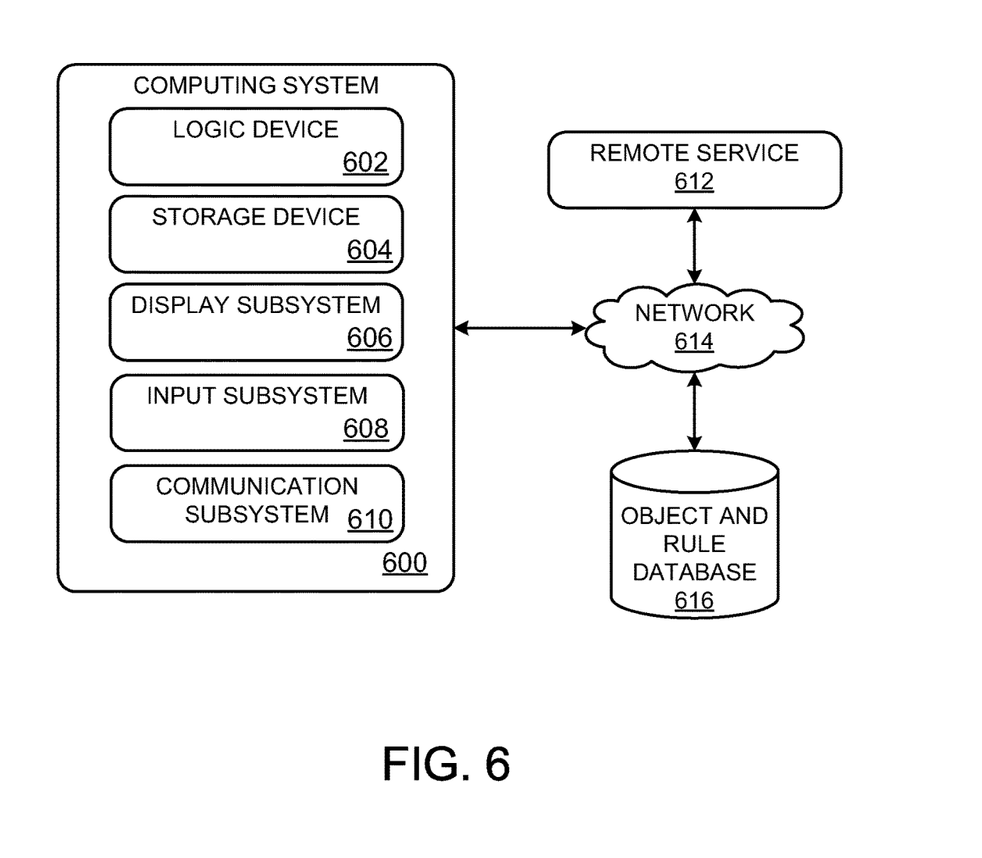
FIG. 6 schematically shows a non-limiting computing system.

FIG. 6 schematically shows a non-limiting embodiment of a computing system 600 that can enact one or more of the methods and processes described above. For example, computing device 102 is one non-limiting example of computing system 600. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic device 602 and a storage device 604 Computing system 600 may optionally include a display subsystem 606, input subsystem 608, communication subsystem 610, and/or other components not shown in FIG. 6.

Logic device 602 includes one or more physical devices configured to execute instructions. For example, the logic device may be configured to execute machine-readable instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 604 includes one or more physical devices configured to hold instructions executable by the logic device to implement the methods and processes described herein. When such methods and processes are implemented, the state of storage device 604 may be transformed—e.g., to hold different data.

Storage device 604 may include removable and/or built-in devices. Storage device 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 604 may include volatile, nonvolatile, dynamic, static, read/write, read-only, random-access, sequential-access, location-addressable, file-addressable, and/or content-addressable devices.

It will be appreciated that storage device 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 602 and storage device 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage device 604. This visual representation may take the form of a graphical user interface (GUI). As the herein described methods and processes change the data held by the storage device, and thus transform the state of the storage device, the state of display subsystem 606 may likewise be transformed to visually represent changes in the underlying data. Display subsystem 606 may include one or more display devices utilizing virtually any type of technology. Such display devices may be combined with logic device 602 and/or storage device 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. For example, as illustrated computing system 600 may communicate with a remote service 612 via a network 614 in order to access an object and rule database 616 storing object identification information and/or sets of rules for one or more processes, for example. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method for monitoring performance of a process by a user involving a first object and a second object, the method comprising:
   sending a request to a remote server for instructional information for the process;
   receiving from the remote server the instructional information, the instructional information including object identification information comprising one or more of three-dimensional object data and an identification function for each of the first object and the second object, and also comprising a set of rules defining one or more portions of the process;
   for a selected portion of the process,
      receiving image information of a physical scene from a depth camera,
      identifying from the image information and the one or more of the three-dimensional object data and the identification function for each of the first object and the second object an operation performed by the user, the operation comprising an interaction of the first object with the second object in the physical scene,
      identifying whether one or more of the first object and the second object is a correct object for the operation; and
      if one or more of the first object and the second object is an incorrect object for the operation, outputting an alert informing the user of the correct object for the operation;
   if the operation does not satisfy a rule associated with the selected portion of the process, outputting an instruction to a display device to instruct how to perform an expected operation to satisfy the rule; and
   if the operation does satisfy the rule, advancing to a subsequent portion of the process.

2. The method of claim 1, wherein the object identification information includes three-dimensional object data usable to identify the first object and the second object in a plurality of different orientations from the image information.

3. The method of claim 1, wherein the rule specifies one or more of an expected object, an expected first position of the expected object, an expected second position of the expected object, an expected path between the first and second positions, and movement of the expected object between the first and second positions in at least one of six degrees of freedom.

4. The method of claim 3, further comprising determining that the operation satisfies the rule if the one or more of the expected object, the expected first position of the expected object, the expected second position of the expected object, and the expected path between the first and second positions are met by the operation.

5. The method of claim 3, further comprising determining that the operation does not satisfy the rule if one or more of the identified object, a beginning position of the identified object, a path of the identified object during the operation, and an ending position of the identified object does not match one or more conditions related to one or more of the expected object, the expected first position, the expected path, and the expected second position of the rule.

6. The method of claim 5, wherein the rule further specifies a given time threshold in which the expected object is to be moved from the first position to the second position, and further comprising determining that the operation does not satisfy the rule if the identified object is not moved from the beginning position to the ending position by the given time threshold.

7. The method of claim 1, wherein taking an action based upon whether the operation satisfies the rule comprises, if the operation does satisfy the rule, for a subsequent selected portion of the process:
receiving image information of the physical scene;
identifying from the image information and the object identification information a subsequent operation performed with the interaction of the first object with the second identified object and a different identified object in the physical scene; and
taking an action based upon whether the subsequent operation satisfies a subsequent rule of the set of rules associated with the subsequent selected portion of the process.

8. The method of claim 1, wherein the instruction comprises one or more of a video instruction, an auditory instruction, and an augmented reality instruction.

9. The method of claim 1, wherein taking an action based upon whether the operation satisfies the rule comprises storing information indicating whether the operation satisfied the rule.

10. The method of claim 1, wherein receiving image information further comprises receiving image information from a visible light camera.

11. The method of claim 1, further comprising tracking movement of the identified object with the received image information in order to identify the operation.

12. On a computing device, a method for monitoring performance of a process involving a first object and a second object, the method comprising:
receiving a set of rules defining one or more actions to be performed by a user on the first object and the second object during the process, the first object and the second object being different than the user;
receiving object identification information regarding the first object and the second object;
for a selected portion of the process,
receiving image information of a physical scene from a depth camera;
identifying from the image information and the object identification information an operation performed by the user on the first object and the second object in the physical scene, the operation comprising an interaction of the first object with the second object;
identifying whether one or more of the first object and the second object is a correct object for the operation;
if one or more of the first object and the second object is an incorrect object for the operation, outputting an alert informing the user of the correct object for the operation;
if the operation does not satisfy a rule, outputting an instruction to a display device to instruct how to perform an expected operation to satisfy the rule; and
if the operation does satisfy the rule, advancing to a subsequent selected portion of the process.

13. The method of claim 12, wherein advancing to the subsequent selected portion of the process comprises:
receiving image information of the physical scene;
identifying from the image information and the object identification information a subsequent operation performed with a different identified object of the first object and the second object in the physical scene; and
outputting an instruction or advancing to a next selected portion of the process based upon whether the subsequent operation satisfies a subsequent rule of the set of rules associated with the subsequent selected portion of the process.

14. The method of claim 12, wherein outputting the instruction comprises outputting one or more of an audio instruction and a visual instruction.

15. The method of claim 14, wherein outputting the visual instruction comprises outputting an augmented reality view of the imaged physical scene to a display device for display, the augmented reality view including a virtual object overlaid on a representation of the physical scene.

16. A hardware storage device holding instructions executable by a logic device to:
send a request to a remote server for instructional information for a process involving a first object and a second object;
receive from the remote server the instructional information, the instructional information including object identification information comprising one or more of three-dimensional object data and an identification function for one or more objects used in the process, and also comprising
a set of rules defining one or more actions to be performed by a user on one or more of the first object and the second object during a process, the first and the second objects being different than the user;
receive depth image information of a physical scene from a depth camera;
receive object identification information comprising three-dimensional object data usable to identify the first object and the second object in a plurality of different orientations from the depth image information;
for a selected portion of the process,
identify from the depth image information and the object identification information an operation performed by the user involving the interaction of the first object with the second object in the physical scene;
identify whether one or more of the first object and the second object is a correct object for the operation;
if one or more of the first object and the second object is an incorrect object for the operation, outputting an alert informing the user of the correct object for the operation;
if the operation does not satisfy a rule, output an instruction to a display device to instruct how to perform an expected operation to satisfy the rule; and
if the operation does satisfy the rule, advance to a subsequent selected portion of the process.

17. The storage device of claim 16, wherein the instruction comprises one or more of an audio instruction and a visual instruction.

18. The storage device of claim 17, wherein the visual instruction comprises an augmented reality view of the physical scene including a virtual object overlaid on a representation of the physical scene.

19. The storage device of claim 16, wherein the process is a first process, and wherein the instructions are further executable to:
observe a second process performed on one or more additional identified objects; and define a second set of rules for the second process based on the observation.

\* \* \* \* \*